Nov. 25, 1952 W. W. GOODE 2,618,876
AUTOMATIC RETURN FARM GATE
Filed April 13, 1950
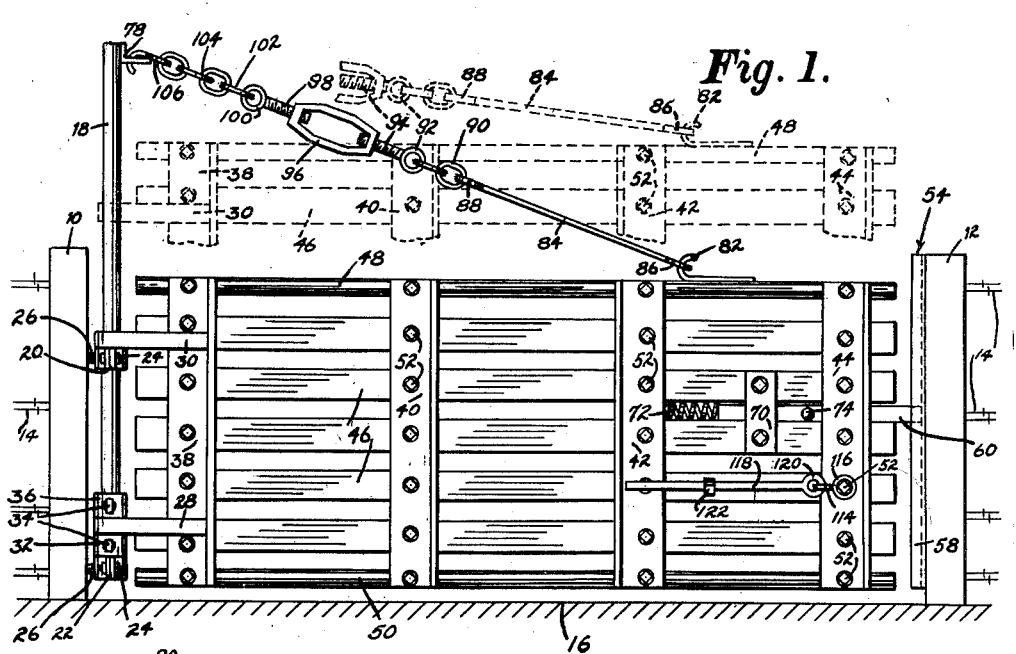
Fig. 1.
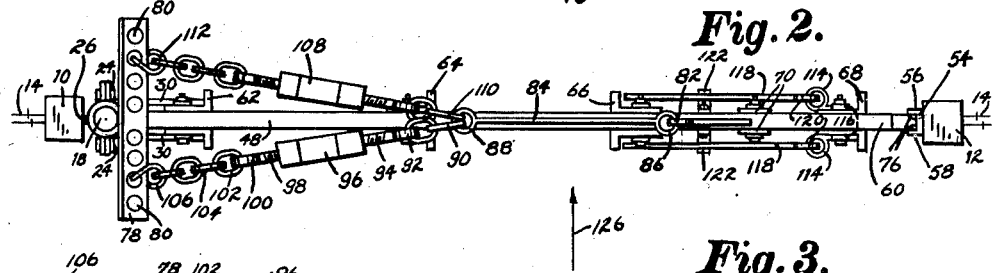
Fig. 2.
Fig. 3.
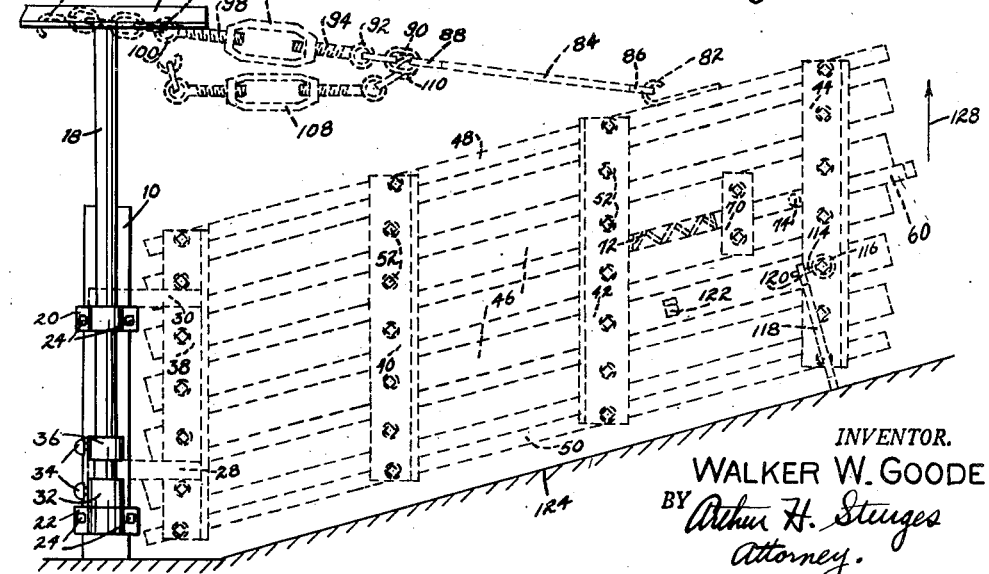
INVENTOR.
WALKER W. GOODE
BY *Arthur H. Sturges*
*Attorney.*

Patented Nov. 25, 1952

2,618,876

UNITED STATES PATENT OFFICE 2,618,876

AUTOMATIC RETURN FARM GATE

Walker W. Goode, Humphrey, Nebr.

Application April 13, 1950, Serial No. 155,707

3 Claims. (Cl. 39—84)

1

This invention relates to farm fence gates and more particularly it is an object of the invention to provide a fence gate which may be raised with respect to the surface of the ground.

Snow drifting around fence gates on farms and the like frequently makes it necessary for a user to first shovel the snow from around the gate in order to open it. Such gates are often relatively wide and for that reason it frequently happens that hummocks in the surface of the ground in the path of the opening-swing of such a gate make it necessary to remove the hummock before the gate is in working order. It is an object of the invention to provide a fence gate for the purpose described so constructed as to be easily raised from the surface of the ground for passing over such hummocks and snow drifts without their removal.

Another object of the invention is to provide a fence gate as described, the latch end of which will automatically raise with respect to the surface of the ground and with respect to the hinged end thereof during a swinging movement of the gate.

A further object of the invention is to provide a farm gate which may be readily raised vertically for a passage of small livestock thereunder.

A still further object is to provide a fence gate which may be employed on the sides of hills with equal facility with respect to level terrain.

Other and still further objects and advantages of the invention will become apparent from the following detailed description of a preferred embodiment thereof.

In the drawings:

Figure 1 is a side elevation of the gate of this invention shown in closed latched position and, by means of dotted lines, other portions thereof in a horizontally raised position.

Figure 2 is a top plan view of the gate as shown in Figure 1.

Figure 3 is a dotted line side elevation of the gate of Figure 1 shown in a swung open position, said position being at a right angle with respect to the showing of the gate in Figure 1, a hummock of ground in the path of opening of the gate being shown in section.

The farm gate of this invention is for attachment between two spaced apart vertically disposed supports 10 and 12 of a fence, horizontally disposed fence members being shown at 14. As is usual, the supports 10 and 12 are disposed projecting vertically and upwardly from the surface of the ground 16.

Since the fence wires are attached to the posts 10 and 12 and do not extend between the said posts, the area between the said posts provides a

2 gateway which may be opened and closed by means of the new gate.

The latter includes a standard 18 which is tubular in cross-section being appreciably longer than the adjacent post 10 as shown in Figure 1.

The standard 18 is provided with two spaced apart bifurcated like clamps 20 and 22 the half portions of which snugly engage the standard 18 at times when the nuts of the end bolts 24 are screw-threadedly drawn taut against the outstanding ears of the half portions of the clamps for locking the clamps to the standard 18. One of the half portions of each of the clamps is provided with a threaded shank 26 which is readily engaged with the gateway post 10, whereby the standard 18 is maintained stationary at all times with respect to the post 10.

The gate of the present invention further includes two spaced apart hinge bars 28 and 30, ends thereof being provided with apertures through which the standard 18 extends whereby said hinge members are pivotally attached for horizontal swinging movements with respect to the stationary standard 18.

The apertured end portion of the member 30 normally abuts against and rests upon the upper side of the clamp 20. Between the upper side of the clamp 22 on the lower side of the hinge member 28 a set-collar 32 is provided. The latter encircles the standard 18 and is slidably disposed with respect thereto being maintained, at desired times, in a locked position with respect to the standard 18 by means of a set screw 34, the latter being provided with a banjo key head whereby the set screw may be manipulated by the fingers of an operator. The lower side of the hinge member 28 abuts the upper side of the slidable collar 32.

Above the hinge member 28 a further and like slidable set-collar 36 is provided having a similar banjo key set screw for locking the collar 36 to the standard 18 in a selected position. The collar 36 prevents the hinge member 28, together with the later described other portions of the gate, from becoming moved upwardly and for purposes later described.

Those ends of the members 28 and 30 which are oppositely disposed with respect to the said apertured ends thereof are welded or otherwise suitably secured to a length of angle iron 38 and further like angle irons are provided the number thereof being proportional to the length of a given gate and, as shown, the three further vertically disposed angle irons 40, 42 and 44 are employed being approximately equi-distantly spaced apart.

The gate further includes a plurality of spaced apart horizontally disposed like bars 46. Preferably the top bar 48, together with the bottom bar 50, is formed of pipe.

The horizontal bars 46, 48 and 50 are each pivotally attached to the vertically disposed end and intermediate angle irons or struts 38, 40, 42 and 44 by means of bolts 52, the apertures or holes for receiving the bolts, the latter being disposed through the vertical and horizontal bars, being accurately positioned so that the vertically disposed bars are freely movable from the full line position thereof shown in Figure 1 to the dotted line positions shown in Figure 3.

The post 12 is provided with a latching member having a slot for receiving a later described latch. Preferably the said slot is provided by means of an employment of a length of U-shaped angle iron 54 having oppositely disposed arms 56 and 58 said arms providing the oppositely disposed walls of a slot therebetween for a reception, between said arms, of a slidable latch 60.

As best shown in Figure 2, the vertically disposed struts or bars 38, 40, 42 and 44 are preferably duplicated at the opposite sides of the horizontally disposed bars 46 and with the like angle iron bars 62, 64, 66 and 68 through which the above mentioned bolts 52 also extend. At times when a small light gate is employed, the bars 62, 64, 66 and 68 may be omitted.

The latch 60 is slidably disposed between the vertical bars 44 and 68. As best shown in Figure 1 a vertically disposed guide bar for the latch 60 is provided said guide bar being indicated at 70. The guide bar 70 is pivotally attached by means of bolts, as shown, to the adjacent horizontal bars 46 and it will be understood that a further guide bar of like construction with respect to the guide bar 70 is disposed at the opposite side of the said adjacent bars 46, whereby an end portion of the latch bar 60 is slidably disposed therebetween, another portion of the latch bar 60 being disposed between the vertical bars 44 and 68.

The latch bar 60 is normally urged towards the slotted member 54 by means of a spring 72, one end of the latter being abutted against the adjacent end of the latch bar 60 and the other end of the said spring being maintained stationary by any suitable means. The latch bar 60 is provided with a handle 74 for moving it away from the detent member 54 and for unlatching the gate at desired times.

As best shown in Figure 2 that end of the latch bar 60 which engages with the member 54 is preferably beveled at each side thereof, as indicated at 76, so that at times when the gate is swung towards a closed position the latch will automatically engage with the detent and without the assistance of an operator.

Adjacent the upper end of the standard 18, the latter is provided with a cross arm 78, the latter, as best shown in Figure 2, being provided with a row of spaced apart apertures 80 for retaining upper ends of adjustable gate supporting braces.

The cross-arm is secured to the standard by any suitable means such as welding or the like.

As best shown in Figure 1, the uppermost horizontal bar 48 of the gate is provided with a hook 82 welded to the bar 48.

A rod 84 having an eye 86 is normally engaged with the hook 82.

The other end of the rod 84 is provided with an eye 88 through which an end link 90 of a chain is disposed. The other end of the chain is attached to the eye 92 of the threaded shank 94 of a turnbuckle 96 said thread, being a right hand thread, is threadedly engaged with one end of the turnbuckle.

The other end of the turnbuckle is similarly engaged with a left hand thread of the shank 98, the latter being provided with an eye 100 for engagement with the end link 102 of a length of chain 104. The other end of the chain 104 is provided with a hook 106 which may be engaged with the cross arm 78 by means of disposing the hook through a selected aperture 80 of said cross arm.

As best shown in Figure 2 a further turnbuckle 108 is employed having a like articulated strand including an end link 110 engaged with the eye 88 of the rod 84 and a hook 112 which is engaged with the cross arm 78 by attaching the hook 112 to said cross arm by means of passing the hook through a selected aperture 80 of the cross arm.

The gate of the instant invention preferably further includes a means for maintaining the gate in a swung open position and said means includes an eye 114 secured by any suitable means to the vertically disposed angle iron bar 44 as by means of welding said eye to a washer 116 through which the adjacent pivot bolt 52 extends. A rod 118 is provided of any suitable length having an eye 120 the latter being pivotally engaged through the eye 114 of the washer 116. The rod 118 is normally maintained in a horizontal position when not in use by means of a support 122, the latter being suitably attached to the adjacent horizontal bar, said support having a crotch as shown in Figure 1 for receiving the rod 118 therein. The free end of the rod 118 may be moved upwardly for detaching it from the member 122 at desired times and for use as later described.

All portions of the gate being assembled as above described with the exception of the bifurcated clamps 20 and 22, the gate is transported to the gateway whereupon the threaded shanks of the said clamps are screw threadedly attached to the post 10, the gate moved to a vertical position, whereupon the other half portions of the said clamps are locked together as shown in Figures 1 and 2 so that the lower end of the standard 18 is disposed a selected position above the surface 16 of the gateway. The slotted detent 54 is now attached to the post 12 by any suitable means so that it is stationary with the said post, whereupon the gate is moved into position, as shown in Figures 1 and 2. At this time the hooks 106 and 112 of the articulated members, which respectively include the turnbuckles 96 and 108, are engaged with the cross arm 78 so that the said hooks 106 and 112 are spread apart for purposes later described.

In operation and assuming that the surface of the gateway is level, as indicated at 16 in Figure 1, and that adjacent said gateway the surface of the soil is inclined or provided with a hummock or a pile of snow which would normally prevent the gate from becoming swung to an open position, said hummock, pile of snow or a similar obstruction being indicated as to the surface of such obstruction at 124 in Figure 3, and that it is desired to swing the gate in the direction of the arrow 126 it will be seen that the bottom bar 50 of the gate will become automatically raised above the surface 124 during a swinging of the gate in the said direction since, during said swinging, that end of the gate which carries the latch bar 60 is caused to move upwardly in the direction of the arrow 128 since the distance between the hook 82 carried by the gate and the hook 106 secured to the cross arm 78 remains the same, whereby the turnbuckle 108 moves downwardly, together with its articulated attached parts and assumes a slack condition of non-use at said time as depicted by the dotted lines in Figure 3.

Similarly and at times when the gate is swung to an open position in a direction opposite to the arrow 126 the turnbuckle 108, together with its adjunct parts, remains taut and the turnbuckle 96 moves downwardly.

The gate being swung open in the direction of the arrow 126 the free end of the rod 118 is then moved downwardly and into engagement with the soil for maintaining the gate in an open position until such time as said free end is removed for permitting the gate to swing to a closed latched position.

During use it often happens that it is desired to permit small sized livestock, such as sheep and hogs, to pass through a gateway and, at times when the snow has become deposited across the gateway, an operator may readily permit said stock to pass through said gateway and without shoveling any of the said snow out of the way of the gate by simply raising the gate without swinging it. For this advantageous purpose the set screws of the collars 32 and 36 are released so that said collars are freely slidable with respect to the standard 18. The gate is now caused to be moved upwardly while the bars 46 of the gate are maintained in a horizontal position, said gate being raised from the full line position thereof shown in Figure 1 to the dotted line position thereof shown in the said figure. During said upward movement that end of the latch which is engaged with the detent 54 slides upwardly in the slot of the latter, the hinge members 28 and 30 sliding upwardly on the stationary standard 18 until the opening between the bottom bar 50 of the gate is disposed sufficiently above the surface 16 of the gateway and above the surface of the snow to permit the said livestock to pass thereunder, whereupon the operator manipulates the set screw 34 for maintaining the collar 32 locked to the standard 18 for preventing the adjacent end of the gate from moving downwardly. Similarly the set screw for the collar 36 is manipulated for preventing the hinge member 28 from moving upwardly during a passage of livestock thereunder and in the event that a large sized animal such as a cow or the like attempts to crawl through the opening, said adjustment of the parts being employed at a time when it is desired to remove small livestock from a field which also contains large sized animals therein.

At the time that end of the gate which is adjacent to the standard is moved upwardly and maintained upwardly by means of the collar 32, that end of the bottom bar 50 which is adjacent to the post 12 is permitted to rest upon the ground 16 or snow deposited in the gateway, whereby but a triangular opening is provided for use when but few animals are to pass under the gate. At times when a large opening which is rectangular is desired for a large quantity of animals through said opening, the collars 32 and 36 are adjusted as heretofore described, whereupon the hooks 106 and 112 are detached by the operator from the cross-arm 78 and a suitable length of the chains which are attached to said hooks are wrapped around the cross-arm 78 for maintaining the bars 46 of the gate in a horizontal position, as shown in Figure 1, whereupon said hooks are engaged to their respective chains or to the cross arm for maintaining that end of the gate which carries the hook 82 in a raised position and at this time the latch bar 60 is engaged with the detent 54.

From the foregoing description it is thought to be obvious that a farm gate constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In a farm gate, the combination which comprises a plurality of vertically spaced horizontally disposed bars, vertically disposed end struts spaced from the ends of the bars and vertically disposed intermediate struts spaced between said end struts, bolts connecting said struts to the horizontally disposed bars whereby the angle between the struts and bars may be selectively, a right angle or an acute angle, a vertically disposed standard spaced from one end of said gate, vertically spaced hinge bars secured to the strut adjacent the end of the gate from which the standard is spaced, said hinge bars having apertures therein through which the standard extends, clamps having threaded shanks extended therefrom mounted on said standard and positioned to coact with said hinge bars for supporting said gate, set-collars on said standard and positioned on opposite sides of one of said hinge bars for adjusting the elevation of said gate, a horizontally disposed cross arm extended laterally from opposite sides of the upper end of said standard, and braces extended from points spaced from the ends of said cross arm and secured to the uppermost of said horizontally disposed bars at a point spaced from the end opposite to that from which the standard is spaced.

2. A farm gate as described in claim 1, wherein the braces are provided with turnbuckles for adjusting the lengths thereof whereby the gate or the outer end thereof is selectively adjustable vertically.

3. In combination with a farm gate as described in claim 1, a rod carried by the gate and positioned to extend below the lowermost of said horizontally disposed bars for retaining the gate in an open position, means retaining the rod in an upwardly disposed position, and a latch bar slidably mounted in said gate.

WALKER W. GOODE.

REFERENCES CITED

The following references are of record in the file of this patent:

UNITED STATES PATENTS

| Number | Name | Date |
|---|---|---|
| 312,427 | Burden | Feb. 17, 1885 |
| 348,940 | Wilson | Sept. 7, 1886 |
| 442,093 | Bates | Dec. 9, 1890 |
| 495,291 | Barnes | Apr. 11, 1893 |
| 773,813 | Saegmuller | Nov. 1, 1904 |
| 1,076,300 | Matey | Oct. 21, 1913 |
| 1,352,810 | Hunt | Sept. 14, 1920 |
| 1,359,764 | Somers | Nov. 23, 1920 |
| 1,615,095 | Matthews | Jan. 18, 1927 |